(12) United States Patent
Haller

(10) Patent No.: US 8,894,364 B2
(45) Date of Patent: Nov. 25, 2014

(54) AEROFOIL BLADE FOR AN AXIAL FLOW TURBOMACHINE

(75) Inventor: Brian Robert Haller, Market Rasen (GB)

(73) Assignee: Alstom Technology Ltd., Baden (CH)

( * ) Notice: Subject to any disclaimer, the term of this patent is extended or adjusted under 35 U.S.C. 154(b) by 497 days.

(21) Appl. No.: 13/346,919

(22) Filed: Jan. 10, 2012

(65) Prior Publication Data
US 2012/0183411 A1   Jul. 19, 2012

(30) Foreign Application Priority Data

Jan. 13, 2011 (EP) .................................. 11150847

(51) Int. Cl.
*F01D 9/02* (2006.01)
*F01D 5/14* (2006.01)
*F01D 9/04* (2006.01)

(52) U.S. Cl.
CPC ............ *F01D 9/041* (2013.01); *F05D 2250/16* (2013.01)
USPC ...... 415/191; 415/211.2; 416/228; 416/241 R

(58) Field of Classification Search
CPC ..... F01D 5/141; F01D 9/02; F05D 2240/121; F05D 2240/303
USPC .................... 415/191, 211.2; 416/228, 241 R
See application file for complete search history.

(56) References Cited

U.S. PATENT DOCUMENTS

| | | | |
|---|---|---|---|
| 4,172,361 A | 10/1979 | Kronogard | |
| 5,779,443 A * | 7/1998 | Haller et al. | ........... 415/191 |
| 5,906,474 A | 5/1999 | Haller et al. | |
| 6,312,219 B1 | 11/2001 | Wood et al. | |
| 6,508,630 B2 * | 1/2003 | Liu et al. | ........... 416/228 |
| 7,354,242 B2 | 4/2008 | Sassanelli | |
| 7,686,567 B2 | 3/2010 | Grover et al. | |
| 7,785,075 B2 * | 8/2010 | Botrel et al. | ........... 416/223 A |
| 8,177,496 B2 * | 5/2012 | Wilson et al. | ........... 415/181 |
| 8,602,727 B2 * | 12/2013 | Bahadur | ........... 415/192 |
| 2002/0141863 A1 | 10/2002 | Liu et al. | |
| 2007/0086886 A1 | 4/2007 | Sassanelli | |

(Continued)

FOREIGN PATENT DOCUMENTS

| | | |
|---|---|---|
| CN | 1126796 A | 7/1996 |
| EP | 0704602 A2 | 4/1996 |

(Continued)

OTHER PUBLICATIONS

European Search Report issued on Mar. 11, 2011, for European Application No. 11150847.9.

(Continued)

*Primary Examiner* — Ninh H Nguyen
(74) *Attorney, Agent, or Firm* — Buchanan Ingersoll & Rooney PC

(57) ABSTRACT

An exemplary aerofoil blade for an axial flow turbomachine has a radially inner platform region, a radially outer tip region, an axially forward leading edge, and an axially rearward trailing edge. The aerofoil blade has a pressure surface which is convex in a radial direction, and a suction surface which is concave in the radial direction. The axial width (W) of the aerofoil blade can vary parabolically between maximum axial widths ($W_{max}$) at the platform and tip regions, respectively and a minimum axial width ($W_{min}$) at a position between the platform region and the tip region.

18 Claims, 4 Drawing Sheets

(56) References Cited

U.S. PATENT DOCUMENTS

| | | |
|---|---|---|
| 2007/0248465 A1 | 10/2007 | Botrel et al. |
| 2009/0317227 A1 | 12/2009 | Grover et al. |
| 2010/0266385 A1* | 10/2010 | Praisner .................. 415/115 |

FOREIGN PATENT DOCUMENTS

| | | |
|---|---|---|
| EP | 0704602 B1 | 2/2001 |
| EP | 1098092 A2 | 5/2001 |
| JP | 53-044711 A | 4/1978 |
| JP | 08-074502 A | 3/1996 |
| JP | 2001-132696 A | 5/2001 |
| JP | 2005-320973 A | 11/2005 |
| JP | 2007-513283 A | 5/2007 |
| JP | 2007-224898 A | 9/2007 |
| JP | 2008-202420 A | 9/2008 |
| WO | 2005/054633 A1 | 6/2005 |

OTHER PUBLICATIONS

Office Action (Notification of Reasons for Refusal) issued on Jul. 22, 2014, by the Japan Patent Office in corresponding Japanese Patent Application No. 2012-003708, and an English Translation of the Office Action. (11 pages).

Office Action issued on Sep. 4, 2014, by the Chinese Patent Office in corresponding Chinese Patent Application No. 201210013188.4. (7 pages).

* cited by examiner

AEROFOIL BLADE FOR AN AXIAL FLOW TURBOMACHINE

RELATED APPLICATION

This application claims priority under 35 U.S.C. §119 to European Patent Application No. 11150847.9 filed in Europe on Jan. 13, 2011, the entire content of which is hereby incorporated by reference in its entirety.

FIELD

The present disclosure relates to an aerofoil blade for an axial flow turbomachine and to an axial flow turbomachine incorporating the aerofoil blade, for use for example, as a turbine blade for a steam turbine or a gas turbine, and including but not limited to fixed blades.

BACKGROUND INFORMATION

Turbine efficiency is desirable, for example, in large installations where a fractional increase in efficiency can result in a significant reduction in the amount of fuel that is needed to produce electrical power. This can lead to cost savings and lower emissions of $CO_2$, with corresponding reductions of SOx and NOx.

Known turbine blades have been of aerofoil cross-section, a fixed blade extending radially between inner and outer end blocks and being of prismatic form. Orientations of both fixed and moving blades about their respective blade axes have also been standardised for the prismatic blade design. The orientation has been defined by the blade stagger angle between the turbine axial direction and a line tangential to blade leading edge and trailing edge circles on a pressure surface of the aerofoil blade.

A known improvement in the performance of the prismatic blade in the turbine has been attempted by imposing a "lean" on the blade, for example, tilting the blade about its root in a circumferential plane, (e.g., a plane transverse, or perpendicular, to the turbine axis). This "lean" can produce a variation in a mass flow at an outlet of the blade from a platform region (at a blade root) to a tip region.

Because the circumferential spacing of the blades (e.g., pitch) increases progressively from the platform region to the tip region, the position where a throat line intersects a suction surface moves upstream with increased radius. Due to the convex curvature of the suction surface, this can lead to an increase in the outlet angle from about 13° at the root (relative to the tangential direction) to about 15° at the tip.

A controlled flow aerofoil blade, which can provide a performance improvement over these known aerofoil blade designs, has been proposed in EP-B1-0704602.

SUMMARY

An aerofoil blade is disclosed, comprising a radially inner platform region, a radially outer tip region, an axially forward leading edge, an axially rearward trailing edge which is straight between the platform region and the tip region and oriented radially of the annular path, a pressure surface which is convex in a radial direction between the radially inner platform region and the radially outer tip region, and a suction surface which is concave in the radial direction between the radially inner platform region and the radially outer tip region, wherein an axial width (W) of the aerofoil blade, being an axial distance between the leading edge and the trailing edge, varies parabolically between maximum axial widths ($W_{max}$) at the platform and tip regions, respectively and a minimum axial width ($W_{min}$) at a position between the platform region and the tip region.

An axial flow turbomachine is disclosed, comprising a ring of aerofoil blades, each airfoil blade comprising a radially inner platform region, a radially outer tip region, an axially forward leading edge, an axially rearward trailing edge which is straight between the platform region and the tip region and oriented radially of an annular path, a pressure surface which is convex in a radial direction between the radially inner platform region and the radially outer tip region, a suction surface which is concave in the radial direction between the radially inner platform region and the radially outer tip region, wherein an axial width (W) of the aerofoil blade, being an axial distance between the leading edge and the straight trailing edge, varies parabolically between maximum axial widths ($W_{max}$) at the platform and tip regions, respectively and a minimum axial width ($W_{min}$) at a position between the platform region and the tip region.

DETAILED DESCRIPTION

Figure 1:
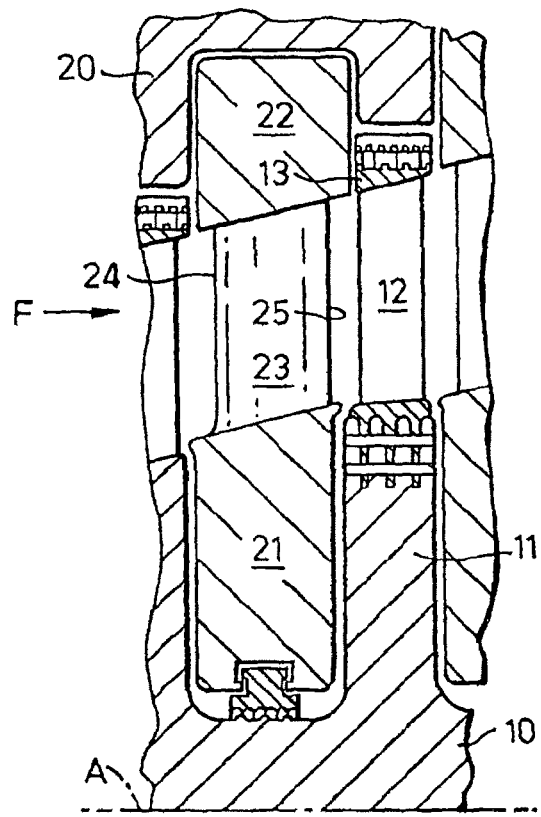
FIG. 1 is a diagrammatic sectional view on an axis of a steam turbine showing a known "disc and diaphragm" high/intermediate pressure steam turbine stage including an assembly of fixed blades.

The following exemplary definitions will be used throughout this specification to describe exemplary embodiments.

A radially innermost extremity of an aerofoil blade will, for example, be referred to as its "platform region" (often referred to as the hub region or root) whilst the radially outermost extremity of an aerofoil blade will be referred to as its "tip region."

A "prismatic" aerofoil blade is designed, for example, such that notional aerofoil sections of the blade, each considered orthogonal to a radial line from the turbine axis, have the same shape from the platform region to the tip region, are not skewed (e.g., have the same setting angle from the platform region to the tip region), and are "stacked" one on top of another so that their leading edges and their trailing edges collectively form straight lines in the radial direction.

The blade outlet angle ($\alpha$) of an aerofoil blade is, for example, the angle, relative to the circumferential direction of the rotor, that the working fluid leaves a circumferential blade row and can be derived from the relationship:

$$\alpha = \sin^{-1} K$$

where: K=throat dimension (t)/pitch dimension (p)

The throat dimension (t) is, for example, defined as a shortest line extending from one aerofoil blade trailing edge normal to a suction surface of an adjacent aerofoil blade in the same row. The pitch dimension (p), for example, is a circumferential distance from one aerofoil blade trailing edge to the adjacent aerofoil blade trailing edge in the same row at a specified radial distance from the platform region of the aerofoil blade.

A setting angle ($\beta$) is, for example, an angle through which any particular aerofoil section at a position along the height or span of the aerofoil blade is displaced in its own plane from a predetermined zero datum. The datum, for example, can be taken as being where the aerofoil section has the same "stagger angle" ($\psi$) as a known prismatic aerofoil blade in a known turbine utilising such aerofoil blades. The stagger angle ($\psi$) is, for example, the angle between the axis of the turbine and a tangent line touching the leading and trailing circles of the aerofoil section, and indicates an orientation of the aerofoil section relative to the turbine axis.

The "chord line" is, for example, a shortest line tangent to leading and trailing edge radii of an aerofoil section. The "chord length" is the distance between two lines normal to the chord line and passing through the points where the chord line touches the leading and trailing edges respectively.

The "axial width" (W) of an aerofoil blade is, for example, an axial distance between its leading and trailing edges (e.g., the distance between its leading and trailing edges as measured along the rotational axis of the turbine).

The Back Surface Deflection (BSD) is, for example, a change in angle on an uncovered surface of the aerofoil blade between the throat point and the trailing edge blend point on the suction surface.

According to an exemplary embodiment of the disclosure, there is provided an aerofoil blade configured for exemplary use as one of a ring of similar blades arranged in an axial flow turbomachine having an annular path for working fluid. The aerofoil blade has a radially inner platform region, a radially outer tip region, an axially forward leading edge and an axially rearward trailing edge which is straight between the platform region and the tip region and oriented radially of the annular path. The aerofoil blade has a pressure surface which is convex in the radial direction between the radially inner platform region and the radially outer tip region and a suction surface which is concave in the radial direction between the radially inner platform region and the radially outer tip region. An axial width (W) of the aerofoil blade, being the axial distance between the leading edge and the straight trailing edge, varies parabolically between a maximum axial width ($W_{max}$) at the platform and tip regions and a minimum axial width ($W_{min}$) at a position between the platform region and the tip region.

The parabolic variation in the axial width (W) of the aerofoil blade between the platform region and the tip region can reduce blade profile losses. For example, the reduced throat dimensions of the aerofoil blade at the platform and tip regions can enable an increased throat dimension to be adopted at positions between the platform and tip regions. This can enable a greater back surface deflection (BSD) to be adopted at positions between the platform and tip regions, thus providing the reduction in blade profile losses.

The back surface deflection at the platform region and at the tip region can be in the range from about 15° to 25° (e.g., ±10%, or lesser or greater). The back surface deflection at the platform region can be substantially the same as the back surface deflection at the tip region. The back surface deflection at both the platform region and the tip region can be about 19° (e.g., ±10%, or lesser or greater). The back surface deflection at a position between the platform region and the tip region, for example at the mid-height position, can vary in the range from about 25° to 35° (e.g., ±10%, or lesser or greater) and can be about 30°.

The parabolic variation in the axial width (W) of the aerofoil blade between the platform region and the tip region can also reduce blade secondary flow losses. In particular, the blade secondary flow losses can be reduced due to the increased axial width (W) of the aerofoil blade at the platform region and the tip region and the decreased axial width of the aerofoil blade at positions between the platform and tip regions.

The pressure surface and/or the suction surface can be substantially symmetrically curved in the radial direction.

A maximum axial width of the aerofoil blade at the platform region ($W_{max\,platform}$) can be substantially the same as a maximum axial width of the aerofoil blade at the tip region ($W_{max\,tip}$).

The maximum axial width of the aerofoil blade at the platform region ($W_{max\,platform}$) and the maximum axial width of the aerofoil blade at the tip region ($W_{max\,tip}$) can be up to approximately 1.2 times the axial width (W) of an equivalent aerofoil blade of prismatic design at corresponding regions thereof (e.g., can be precisely 1.2 times, e.g., ±10%, or lesser or greater). In exemplary embodiments, the maximum axial width of the aerofoil blade at the platform region ($W_{max\,platform}$) and the maximum axial width of the aerofoil blade at the tip region ($W_{max\,tip}$) can be about 1.076 times the axial width (W) of an equivalent aerofoil blade of prismatic design at corresponding regions thereof.

A minimum axial width ($W_{min}$) of the aerofoil blade at a position between the platform region and the tip region, and in exemplary embodiments, at the mid-height position between the platform region and the tip region, can be up to approximately 0.9 times the axial width (W) of an equivalent aerofoil blade of prismatic design at a corresponding position between the platform region and the tip region. In exemplary embodiments, the minimum axial width ($W_{min}$) of the aerofoil blade at a position between the platform region and the tip region, and in exemplary embodiments, at the mid-height position between the platform region and the tip region, can be about 0.893 times the axial width (W) of an equivalent aerofoil blade of prismatic design at a corresponding position between the platform region and the tip region.

The aerofoil blade can have a variable aerofoil section between the platform region and the tip region. It is this variation in the aerofoil section that can provide the parabolic variation in the axial width (W) of the aerofoil blade, rather than a variation in the setting angle ($\beta$) of the aerofoil sections, for example. Accordingly, the aerofoil sections between the platform region and the tip region normally have the same setting angle ($\beta$).

The minimum axial width ($W_{min}$) of the aerofoil blade can occur at a position mid-height between the platform region and the tip region. The parabolic variation in the axial width (W) of the aerofoil blade can be symmetrical about the position mid-height between the platform region and the tip region.

The K value, being equal to the ratio of the throat dimension (t) to the pitch dimension (p) as herein defined, can vary between minimum values ($K_{min\,platform}$) and ($K_{min\,tip}$) at the platform region and the tip region respectively and a maximum value ($K_{max}$) at a position between the platform region and the tip region. The blade outlet angle ($\alpha$) can, thus, vary between minimum values ($\alpha_{min}$) at the platform region and the tip region respectively and a maximum value ($\alpha_{max}$) at a position between the platform region and the tip region.

In exemplary embodiments, the minimum K value at the platform region ($K_{min\ platform}$) can be substantially equal to the minimum K value at the tip region ($K_{min\ tip}$). The blade outlet angle at the platform region ($\alpha_{platform}$) can be substantially equal to the blade outlet angle at the tip region ($\alpha_{tip}$).

The maximum K value ($K_{max}$) can occur at a position mid-height (or approximately mid-height) between the platform region and the tip region. The maximum blade outlet angle ($\alpha_{max}$) thus occurs at this mid-height position. Blade profile losses can thus be advantageously reduced at the region mid-height between the platform region and the tip region.

The variation of the K value, and hence of the blade outlet angle ($\alpha$), can be parabolic and can be substantially symmetrical about a position mid-height between the platform region and the tip region.

In exemplary embodiments, $K_{min\ platform}$ can be approximately 0.1616 (e.g., ±10%, or lesser or greater) which gives a blade outlet angle at the platform region ($\alpha_{platform}$) of approximately 9.3° (i.e. about 9°), $K_{min\ tip}$ can be approximately 0.1633 which gives a blade outlet angle at the tip region ($\alpha_{tip}$) of approximately 9.4° (i.e. about 9°) and $K_{max}$, at a position mid-height between the platform region and the tip region, can be approximately 0.2823 which gives a blade outlet angle ($\alpha_{max}$) at the mid-height position of approximately 16.4° (e.g., about 16°).

The mean throat dimension ($t_{mean}$) of the aerofoil blade can be substantially equal to the mean throat dimension of an equivalent aerofoil blade of prismatic design. This ensures that the mean reaction is substantially equal to the mean reaction of an equivalent aerofoil blade of prismatic design.

The aerofoil blade can be a fixed blade of a turbine stage which includes a ring of the fixed blades.

According to an exemplary embodiment of the present disclosure, there is provided an axial flow turbomachine incorporating a ring of aerofoil blades according to exemplary embodiments of the disclosure.

The axial flow turbomachine can be a turbine such as a steam turbine or a gas turbine. The turbine can include at least one turbine stage having fixed turbine blades according to exemplary embodiments of the present disclosure.

Exemplary embodiments of the disclosure will now be described by way of example only and with reference to the accompanying drawings.

There is shown in FIG. 1 a diagrammatic axial sectional view of a known disc and diaphragm high/intermediate pressure steam turbine stage. The direction of flow F of the working fluid, steam, is substantially parallel to a turbine rotor axis A. The rotor 10 has, for each stage, a disc 11 to which is secured a set or row of circumferentially aligned and spaced apart moving blades 12. The blades 12 have a shroud 13 attached to their radially outer ends. Energy in the steam flowing in the direction F from the front to the rear of the turbine can be converted into mechanical energy in the rotor 10.

For each turbine stage, a fixed blade assembly precedes the set of moving blades 12 and is secured to the turbine inner casing 20. This fixed blade assembly includes a radially inner ring 21, a radially outer ring 22 and a row of circumferentially aligned and spaced apart fixed blades 23. Each blade 23 is secured at a radially inner end, at its platform region, to the inner ring 21 and at a radially outer end, at its tip region, to the outer ring 22. Each blade has an upstream leading edge 24 facing the flow and an axially downstream trailing edge 25.

The assembly of fixed blades 23 with the inner and outer rings 21, 22 is known as a diaphragm. The disc and diaphragm stage shown in FIG. 1 is of the type in which the area between the inner and outer rings 21, 22 orthogonal to the turbine axis A is larger at the fixed blade trailing edges 25 than at the blade leading edges 24. Furthermore, in the example shown in FIG. 1, the surfaces, (e.g., the end walls), of the rings (or end blocks) 21, 22 to which the fixed blades 23 are secured have a frusto-conical shape diverging from the turbine axis A in the direction F from the leading 24 to the trailing 25 edges of the blades 23.

Figure 2:
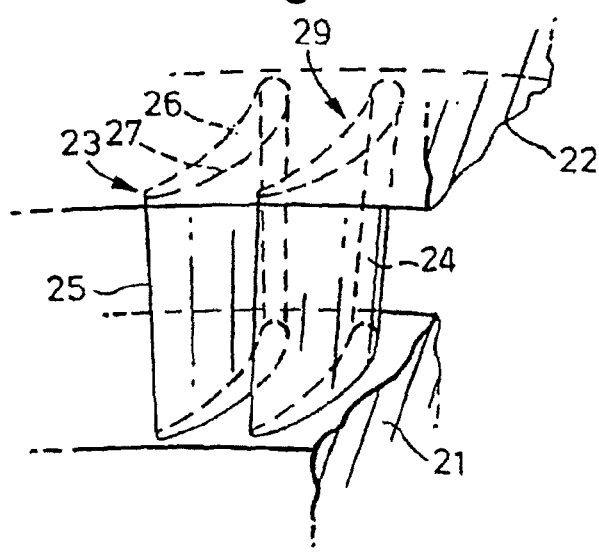
FIG. 2 is a perspective view of two such known blades in the fixed blade diaphragm.

Referring now to FIG. 2, there is shown a rear view of part of a fixed blade assembly which is of the type shown in FIG. 1. The fixed blades 23 shown in FIG. 2 are of the known prismatic kind, that is, they are each straight, i.e. designed such that the notional aerofoil sections of the blade, each considered orthogonal to a radial line from the turbine axis A, have the same shape from the blade platform region to the blade tip region, are untwisted from the platform region to the tip region and are stacked with the leading edge 24 and the trailing edge 25 each on a straight line. Each blade 23 has a concave pressure surface 26 and a convex suction surface 27.

Figure 3A:
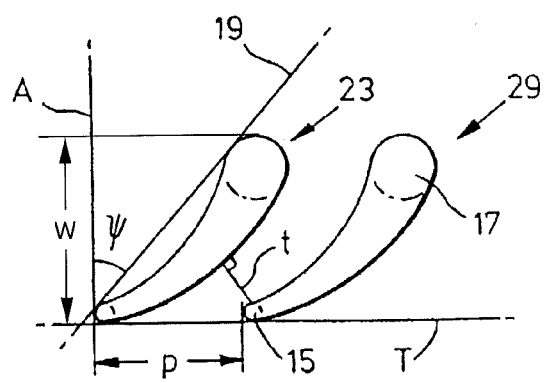
FIG. 3(a) is a diagrammatic view of the blades of FIG. 2 in the radial direction.
Figure 3B:
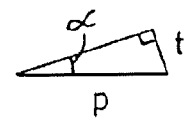
FIG. 3(b) is a diagram illustrating the outlet angle ($\alpha$) from the fixed blades.

Referring to FIG. 3(a) this illustrates, in a radial plan view, the orientation of fixed blades 23 and 29 relative to the turbine axis A and the transverse (e.g., tangential or circumferential) plane T containing the fixed blade ring and to which the turbine axis A is perpendicular. The blade aerofoil section is based on a small trailing edge circle 15 and a larger leading edge circle 17. The tangent line 19 to these two circles is at an angle $\psi$, the stagger angle as hereinbefore defined, from the turbine axis A direction. It will be seen that the axial width (W) of these known fixed blades 23, 29 at a given radial position is the distance between the leading and trailing edges 24, 25 at the given radial position.

If a perpendicular line is drawn from the suction surface 27 of blade 23 to meet the pressure surface 26 of the adjacent blade 29, and then if the shortest such line is taken, this is the throat dimension t, which occurs in the region of the trailing edge 25 of the blade 29. The ratio of this throat dimension (t) to the pitch dimension (p) of the fixed blades gives a value K, which is equal to the sine of the outlet angle ($\alpha$), as hereinbefore defined. It can be seen that, approximately, this angle is the outlet angle from each blade relative to the transverse plane T.

Figure 4:
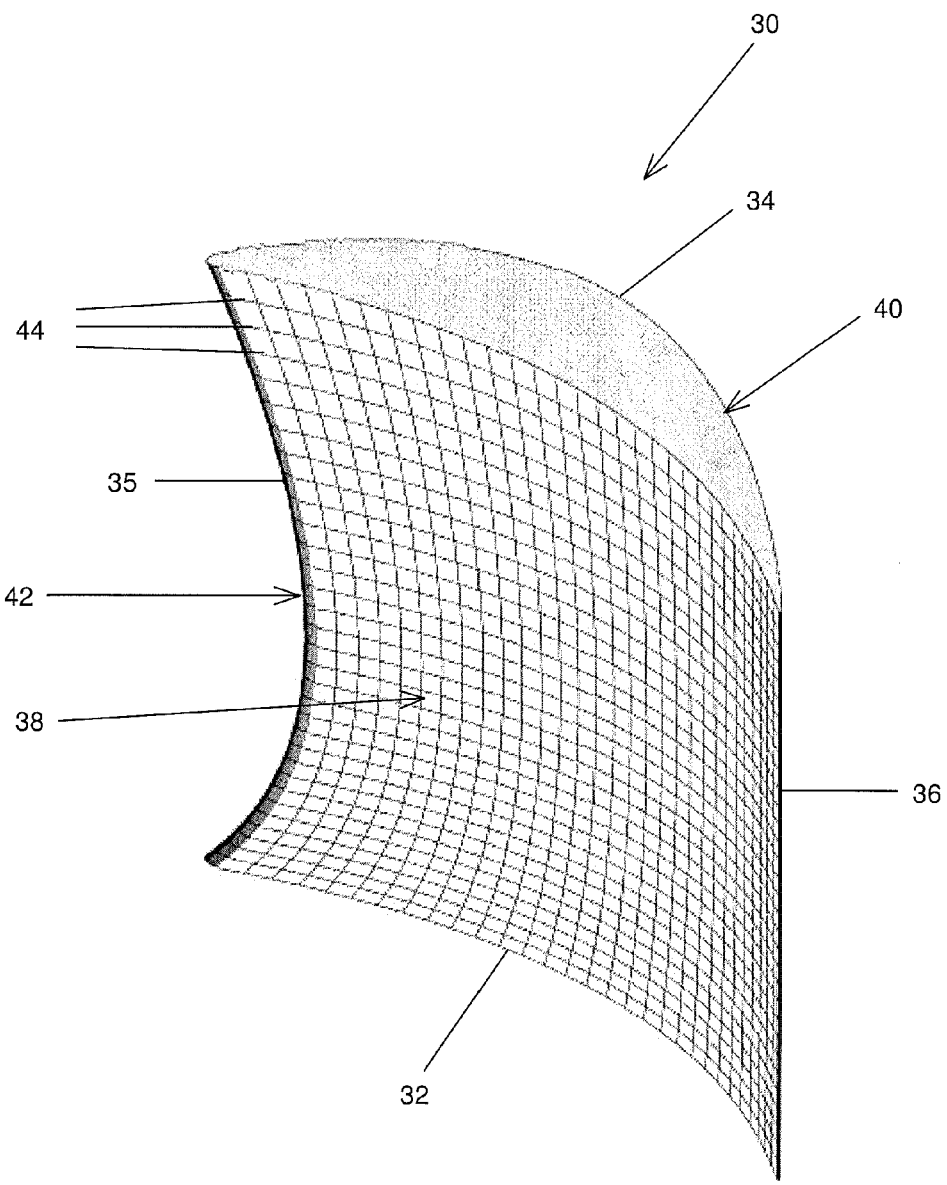
FIG. 4 is a perspective view of an aerofoil blade according to an exemplary embodiment of the disclosure.

FIG. 4 shows an aerofoil blade 30 which is shaped in accordance with the principles of the disclosure and which can be incorporated into the fixed blade assembly described above. The aerofoil blade 30 has a straight trailing edge 36, like the known prismatic blade, between the platform region 32 and the tip region 34. The aerofoil blade 30 has a pressure surface 38 and a suction surface 40 which are respectively convexly and concavely symmetrically curved in the radial direction between the platform region 32 and the tip region 34.

The axial width (W) of the aerofoil blade 30 varies along the height or span of the blade 30, and more particularly varies parabolically and symmetrically between a maximum axial width ($W_{max}$) at the platform and tip regions 32, 34 and a minimum axial width ($W_{min}$) at a position between the platform region 32 and the tip region 34. It will, therefore, be understood that the leading edge 35 of the aerofoil blade 30 is not straight, in contrast to the trailing edge 36, and instead that it is curved in the axial direction. In the illustrated exemplary embodiment, the curvature of the leading edge 35 is symmetrical about the mid-height position 42 between the platform and tip regions 32, 34 such that the maximum axial width at the platform region 32 ($W_{max\ platform}$) is substantially equal to the maximum axial width at the tip region 34

($W_{max\ tip}$) with the minimum axial width ($W_{min}$) occurring at the mid-height position 42 between the platform region 32 and the tip region 34.

The parabolic variation of the axial width (W) of the blade can be achieved by varying the aerofoil blade sections 44 between the platform region 32 and the tip region 34, with the aerofoil sections each having the same setting angle (β).

Exemplary parameters of an exemplary embodiment of the aerofoil blade 30 illustrated in FIG. 4 are shown in Table 1 below.

TABLE 1

|  | Platform (i.e. hub) region | Mid-height position | Tip region |
|---|---|---|---|
| r, trailing edge (mm) | 420 | 462 | 504 |
| Axial width (W) (mm) | 73.42 | 68.20 | 73.42 |
| K (=sin α) | 0.16 | 0.28 | 0.16 |
| Throat (t) (mm) | 8.88 | 17.07 | 10.77 |
| Pitch (p) (mm) | 54.978 | 60.476 | 65.973 |
| BSD (deg) | 19.44 | 30 | 19.22 |

Figure 5:
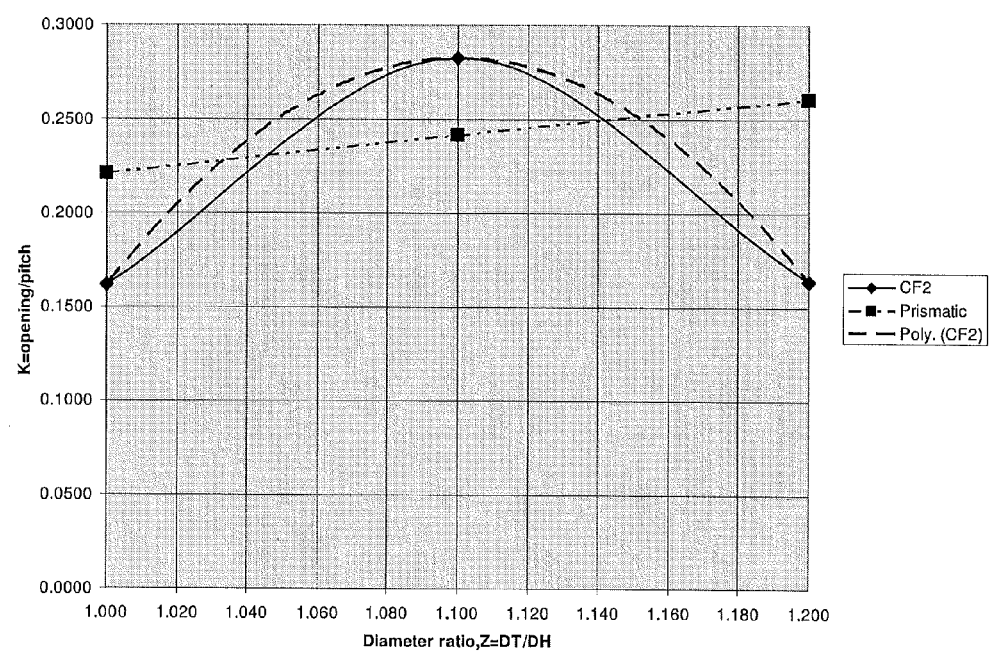
FIG. 5 is a graph showing variation of a K value against a height of the aerofoil section from the platform region to the tip region for a known prismatic aerofoil blade and for controlled flow aerofoil blades according to an exemplary embodiment of the disclosure.

FIG. 5 illustrates an exemplary relation between the K value (which is equal to the sine of the blade outlet angle (α)) and the radial height of the blade section for two different aerofoil blades 30 according to an exemplary embodiment of the present disclosure having the parameters shown in Table 1 and for a known equivalent prismatic aerofoil blade having a constant axial width (W) between the platform region and the tip region of about 68.2 mm.

For the known prismatic aerofoil blade, it will be seen that the K value increases substantially linearly between a minimum value at the platform region and a maximum value at the tip region. This is equivalent to a substantially linear increase in the blade outlet angle (α) between, for example, about 13° at the platform region and about 15° at the tip region. This increase in the blade outlet angle (α) corresponds simply to the increase in the blade pitch (p) with increasing radius.

For the controlled flow aerofoil blades 30 according to an exemplary embodiment of the present disclosure, it will be seen that the K value varies parabolically and symmetrically about the mid-height position 42 of the blade between equal minimum K values at the platform region and the tip region ($K_{min\ platform}=K_{min\ tip}$) and a maximum K value ($K_{max}$) at the mid-height position. The minimum K values are equivalent to blade outlet angles at the platform region ($α_{platform}$) and at the tip region of ($α_{tip}$) of, for example, about 9° and a maximum blade outlet angle ($α_{max}$) at the mid-height position of, for example, about 16°. The decrease in the K value, and hence the outlet angle α, at the platform and tip regions can enable the K value, and hence the outlet angle α, to be increased at the mid-height position between the platform and tip regions. Blade profile losses can, thus, be reduced in the mid-height region.

Although embodiments of the disclosure have been described in the preceding paragraphs, it should be understood that various modifications can be made to those embodiments without departing from the scope of the following claims.

While the disclosure has been described in relation to the use of short height HP/IP fixed blades in a steam turbine of the low reaction disc and diaphragm type, it can also be applicable to other types of axial flow turbine and compressor, and to moving aerofoil blades as well as fixed aerofoil blades.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An aerofoil blade, comprising:
   a radially inner platform region;
   a radially outer tip region;
   an axially forward leading edge; and
   an axially rearward trailing edge which is straight between the platform region and the tip region and oriented radially of an annular path;
   a pressure surface which is convex in a radial direction between the radially inner platform region and the radially outer tip region; and
   a suction surface which is concave in the radial direction between the radially inner platform region and the radially outer tip region;
   wherein an axial width (W) of the aerofoil blade, being an axial distance between the leading edge and the straight trailing edge, varies parabolically between maximum axial widths ($W_{max}$) at the platform and tip regions, respectively and a minimum axial width ($W_{min}$) at a position between the platform region and the tip region;
   wherein a K value, being equal to a ratio of a throat dimension (t) to a pitch dimension (p), varies between minimum values ($K_{min\ platform}$) and ($K_{min\ tip}$) at the platform region and the tip region respectively, and a maximum value ($K_{max}$) at a position between the platform region and the tip region;
   wherein the minimum K value at the platform region ($K_{min\ platform}$) is substantially equal to the minimum K value at the tip region ($K_{min\ tip}$).

2. An aerofoil blade according to claim 1, comprising:
   a variable aerofoil section between the platform region and the tip region to provide parabolic variation in the axial width (W) of the aerofoil blade.

3. An aerofoil blade according to claim 2, wherein the aerofoil sections between the platform region and the tip region have a same setting angle (β).

4. An aerofoil blade according to claim 1, wherein minimum axial width ($W_{min}$) of the aerofoil blade occurs at a position mid-height between the platform region and the tip region.

5. An aerofoil blade according to claim 4, wherein parabolic variation in the axial width (W) of the aerofoil blade is symmetrical about the position mid-height between the platform region and the tip region.

6. An aerofoil blade according to claim 1, wherein the maximum K value ($K_{max}$) occurs at a position mid-height between the platform region and the tip region.

7. An aerofoil blade according to claim 1, wherein variation of the K value is parabolic and substantially symmetrical about a position mid-height between the platform region and the tip region.

8. An aerofoil blade according to claim 1, wherein the aerofoil blade is a fixed blade of a turbine stage, the turbine stage, in combination, comprising:
   a ring of the fixed blades.

9. An aerofoil blade according to claim 1, wherein the aerofoil blade is in combination with a ring of similar blades arranged in an axial flow turbomachine having an annular path for working fluid.

10. An aerofoil blade according to claim 1, wherein maximum axial widths ($W_{max}$) at the platform and tip regions are substantially the same.

11. An aerofoil blade according to claim 1, wherein the airfoil blade is a fixed blade.

12. An axial flow turbomachine, including a ring of aerofoil blades, each aerofoil blade comprising:
   a radially inner platform region;
   a radially outer tip region;
   an axially forward leading edge;
   an axially rearward trailing edge which is straight between the platform region and the tip region and oriented radially of an annular path;
   a pressure surface which is convex in a radial direction between the radially inner platform region and the radially outer tip region; and
   a suction surface which is concave in the radial direction between the radially inner platform region and the radially outer tip region;
   wherein an axial width (W) of the aerofoil blade, being an axial distance between the leading edge and the straight trailing edge, varies parabolically between maximum axial widths ($W_{max}$) at the platform and tip regions, respectively and a minimum axial width ($W_{min}$) at a position between the platform region and the tip region;
   wherein a K value, being equal to a ratio of a throat dimension (t) to a pitch dimension (p), varies between minimum values ($K_{min\ platform}$) and ($K_{min\ tip}$) at the platform region and the tip region respectively, and a maximum value ($K_{max}$) at a position between the platform region and the tip region;
   wherein the minimum K value at the platform region ($K_{min\ platform}$) is substantially equal to the minimum K value at the tip region ($K_{min\ tip}$).

13. An axial flow turbomachine according to claim 12, each aerofoil blade comprises:
   a variable aerofoil section between the platform region and the tip region to provide parabolic variation in the axial width (W) of the aerofoil blade.

14. An axial flow turbomachine according to claim 13, wherein the aerofoil sections between the platform region and the tip region have a same setting angle ($\beta$).

15. An axial flow turbomachine according to claim 12, wherein the minimum axial width ($W_{min}$) of the aerofoil blades occur at a position mid-height between the platform region and the tip region.

16. An axial flow turbomachine according to claim 15, wherein parabolic variation in the axial width (W) of the aerofoil blades is symmetrical about the position mid-height between the platform region and the tip region.

17. An axial flow turbomachine according to claim 12, the maximum K value ($K_{max}$) occurs at a position mid-height between the platform region and the tip region.

18. An axial flow turbomachine according to claim 12, wherein variation of the K value is parabolic and substantially symmetrical about a position mid-height between the platform region and the tip region.

* * * * *